United States Patent

[11] 3,622,640

| [72] | Inventors | Edward C. Taylor<br>Princeton, N.J.;<br>Alexander McKillop, Norwich, England |
|---|---|---|
| [21] | Appl. No. | 766,002 |
| [22] | Filed | Oct. 8, 1968 |
| [45] | Patented | Nov. 23, 1971 |
| [73] | Assignee | Smith, Kline & French Laboratories<br>Philadelphia, Pa. |

[54] AROMATIC BROMINATION PROCESS
4 Claims, No Drawings

[52] U.S. Cl. ........................................ 260/650 R,
260/473 R, 260/562 R, 260/577, 260/600,
260/609 R, 260/612 D, 260/613 D, 260/646,
260/649 R, 260/649 DP, 260/649 F, 260/650 F
[51] Int. Cl. ........................................ C07c 25/04
[50] Field of Search ............................ 260/649,
649 DP, 649 F, 650, 650 F, 646, 600, 612 D, 613
D, 473, 604 D, 577, 562; 252/431 C

[56] References Cited
UNITED STATES PATENTS

| 2,094,227 | 9/1937 | Wolfram et al. ............. | 260/649 |
| 2,659,760 | 11/1953 | Frevel et al. ................ | 260/650 |
| 2,778,857 | 1/1957 | Beman et al. ................ | 260/650 X |

OTHER REFERENCES

Kabbe, Chem. Abstr., 58 1376 C, 1963, copy in library
Uemura et al., Chem. Abstr., 65 19962 F, 1966, copy in library

*Primary Examiner*—Howard T. Mars
*Attorneys*—William H. Edgerton, Richard D. Foggio, Joan S Keps, Arthur R. Eglington, Alan D. Lourie and Joseph A. Marlino ABSTRACT: Aromatic substrates such as benzene, substituted benzenes, naphthalenes, substituted naphthalenes, anthracene, phenanthrene, fluorene, biphenylene, and terphenyl are brominated to give pure monobromo products by reaction with bromine in the presence of thallic acetate.

AROMATIC BROMINATION PROCESS

This invention relates to a process for brominating aromatic substrates. In particular, the invention relates to a process for brominating benzene ring compounds with bromine in the presence of thallic acetate.

The present process constitutes a rapid and convenient method of obtaining pure brominated aromatic compounds in high yield. Its other advantages include mildness of reaction conditions, lack of polysubstitution, and ease of workup. It is particularly applicable to carbocyclic compounds including benzene; substituted benzenes; naphthalene; substituted naphthalenes; and polycyclic aromatic compounds such as anthracene, phenanthrene, fluorene, biphenylene, and p-terphenyl. The process is especially advantageous in cases where bromination by other methods is extremely difficult or requires special techniques; biphenylene, anthracene, and fluorene are examples of such substrates. The most important advantage of the present process is the specificity of reaction. In contrast to the vast majority of electrophilic halogenation reactions, application of the present process to substituted benzenoid compounds results in the formation of a single pure monobromo isomer. The process may also be applicable to the bromination of heterocyclic aromatic substrates.

The substituents on the aromatic nucleus to be brominated may be, but are not necessarily limited to, alkoxy, alkylthio, alkylamino, dialkylamino, acylamino, alkyl, nitro, halo, and carbalkoxy. The terms alkyl and acyl are intended to include lower alkyl or lower acyl groups containing up to about six carbon atoms.

When moderately reactive aromatic substrates are brominated, dry bromine is added to a mixture of the aromatic substrate and thallic acetate in a suitable organic solvent. The molar amounts of the substrate and bromine are approximately equal, and about three times that of the thallic acetate. When the bromine addition has been completed, it is desirable to heat the mixture, conveniently at reflux, for a short period of time; one-half hour is suitable. The temperature and heating time are not critical, the end-point of the reaction being observed by the disappearance from the mixture of the bromine color. Lower temperatures necessitate longer reaction times. Generally, the reaction can be conducted over a temperature range of 0° to the reflux temperature of the solvent. Suitable solvents for the reaction include carbon tetrachloride, nitromethane, acetic acid, chloroform, and dichloroethan. When the reaction is completed, the product is obtained according to conventional workup procedure; conveniently, the inorganic thallium byproducts are filtered off, the filtrate washed with aqueous sodium bicarbonate solution, dried and removed, and the residual product purified by chromatography on alumina and distillation or crystallization.

Highly reactive substrates or those in which sidechain bromination may occur, are brominated at approximately 0° C. When a haloaromatic substrate is brominated, it may be used in excess as the reaction solvent.

The brominated compounds prepared by the present process are generally known compounds, having a variety of known uses in industry or in organic synthesis. As examples, bromobenzene is used as a motor oil additive and bromonaphthalene is used in spectroscopy and refractometry.

The following examples are intended to illustrate the process of the invention, but are not to be construed as limiting its scope. Various modifications in the reactants and conditions of the process are obvious and will occur to those skilled in the art of organic chemistry. They are to be considered equivalent to the invention and are within its scope.

EXAMPLE 1

A mixture of 10.8 g. (0.1 mole) of anisole and 11.43 g. (0.03 mole) of thallic acetate in 100 ml. of carbon tetrachloride is stirred under nitrogen, and a solution of 16.0 g. (0.1 mole) of dry bromine in 30 ml. of carbon tetrachloride added at such a rate that no free bromine is present at any time. When addition of bromine has been completed, the mixture is refluxed for one-half hour, the hot reaction mixture filtered through a sintered funnel to remove the inorganic thallium products, and the filtrate washed with aqueous $NaHCO_3$ solution and dried over anhydrous $Na_2SO_4$. The solvent is removed under reduced pressure, the residue dissolved in chloroform, and the solution filtered through a short column of alumina, using chloroform as eluent. Removal of the solvent and distillation gives 4-bromoanisole in 91 percent yield.

EXAMPLE 2

When following aromatic substrates are brominated according to the procedure of example 1, the corresponding listed products are obtained.

| Substrate | Product | Yield |
|---|---|---|
| N,N-dimethylaniline | 4-bromo-N,N-dimethylaniline | 75 |
| N-methylaniline | 4-bromo-N-methylaniline | 60 |
| Thioanisole | 4-bromothioanisole | 73 |
| Benzene | Bromobenzene | 85 |
| Acetanilide | 4-bromoacetanilide | 95 |
| Biphenyl | 4-bromobiphenyl | 93 |
| 2-nitrobiphenyl | 4'-bromo-2-nitrobiphenyl | 70 |
| 1,2-dimethoxybenzene | 4-bromo-1,2-dimethoxybenzene | 85 |
| 1,3-dimethoxybenzene | 4-bromo-1,3-dimethoxybenzene | 87 |
| 1,2-dimethylbenzene | 4-bromo-1,2-dimethylbenzene | 85 |
| 1,3-dimethylbenzene | 4-bromo-1,3-dimethylbenzene | 88 |
| 1,4-dimethylbenzene | 2-bromo-1,4-dimethylbenzene | 76 |
| 4-methoxybenzaldehyde | 2-bromo-4-methoxybenzaldehyde | 66 |
| 2-nitroanisole | 2-nitro-4-bromoanisole | 90 |
| 3-nitroanisole | 3-nitro-4-bromoanisole | 60 |
| 4-nitroanisole | 2-bromo-4-nitroanisole | 95 |
| Methyl anisate | Methyl 2-bromo anisate | 90 |
| Methyl 3-methoxybenzoate | Methyl 3-methoxy-4-bromo-benzoate | 93 |
| Methyl 2-methoxybenzoate | Methyl 2-methoxy-5-bromo-benzoate | 90 |
| Naphthalene | 1-bromonaphthalene | 71 |
| 1-methylnaphthalene | 1-methyl-4-bromonaphthalene | 84 |
| 1-methoxynaphthalene | 1-methoxy-4-bromonaphthalene | 70 |
| 2-methoxynaphthalene | 1-bromo-2-methoxynaphthalene | 68 |
| 1-nitronaphthalene | 1-nitro-5-bromonaphthalene | 75 |
| Anthracene | 9-bromoanthracene | 89 |
| Phenanthrene | 9-bromophenanthrene | 78 |
| Fluorene | 2-bromofluorene | 96 |
| Biphenylene | 2-bromobiphenylene | 88 |
| p-Terphenyl | 4-bromo-p-terphenyl | 80 |

EXAMPLE 3

The following procedure is best applied to those substrates which are highly reactive. Such substrates include alkylated benzenes, naphthalenes, and other polycyclic hydrocarbons, including ethylbenzene, propylbenzene, and isopropylbenzene, etc.

Thallic acetate and bromine, in the same molar proportions as in example 1, are mixed together in carbon tetrachloride and cooled to 0° C. Ethylbenzene is then added dropwise over a 15 minute period. Stirring is continued for another 15 minutes and the mixture is then worked up as in example 1 to give 4-bromoethylbenzene (60 percent).

EXAMPLE 4

When the substrate is a halo aromatic compound, the following procedure may be used:

To a mixture of 11.43 g. (0.03 mole) of thallic acetate in 100 ml. of chlorobenzene under nitrogen is added 16.0 g. (0.1 mole) of dry bromine. The reaction mixture is gently heated as bromine is added and the heating is discontinued when the bromine color has begun to be discharged (a few minutes). The product (4-bromochlorobenzene) is obtained in 70 percent yield by filtering off the thallium residue and distilling the filtrate.

Other substrates brominated according to this procedure include fluorobenzene (gave 4-bromofluorobenzene in 70 percent yield), bromobenzene (gave p-dibromobenzene in 73 percent yield), and iodobenzene (gave 4-bromoiodobenzene in 69 percent yield).

We claim:

1. A process for brominating the aromatic nucleus of a carbocyclic aromatic compound selected from the group consisting of an unsubstitued aromatic hydrocarbon, a halosubstituted aromatic hydrocarbon and a lower alkyl substituted aromatic hydrocarbon comprising reacting together in a organic solvent capable of solubilizing the reactants, at a temperature of from 0° C. to the boiling point of the solvent, equimolar quantities of bromine and the aromatic compound in the presence of one-third of a molar equivalent of thallic acetate.

2. A process according to claim 1, in which the aromatic compound is benzene, ethylbenzene, biphenyl, flouorobenzene, chlorobenzene, bromobenzene, iodobenzene, 1,2-dimethylbenzene, 1,3-dimethylbenzene, 1,4-dimethylbenzene, naphthalene, 1-methylnaphthalene, anthracene, phenathrene, fluorene, biphenylene, or p-terphenyl.

3. A process according to claim 2, in which the aromatic compound is benzene.

4. A process according to claim 2 in which the aromatic compound is naphthalene.

* * * * *